United States Patent
Cedola

(10) Patent No.: US 7,735,095 B2
(45) Date of Patent: Jun. 8, 2010

(54) NETWORK DEVICE DRIVERS USING A COMMUNICATION TRANSPORT

(75) Inventor: Kent D. Cedola, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1273 days.

(21) Appl. No.: 10/428,611

(22) Filed: May 2, 2003

(65) Prior Publication Data

US 2004/0221298 A1   Nov. 4, 2004

(51) Int. Cl.
G06F 3/00 (2006.01)
G06F 9/44 (2006.01)
G06F 13/00 (2006.01)
G06F 15/16 (2006.01)

(52) U.S. Cl. .............. 719/321; 719/327; 719/328; 709/227; 709/230

(58) Field of Classification Search ........... 719/321, 719/327, 328; 709/227, 230
See application file for complete search history.

(56) References Cited

U.S. PATENT DOCUMENTS

| | | | |
|---|---|---|---|
| 5,485,460 A * | 1/1996 | Schrier et al. ............ 709/227 |
| 5,953,507 A * | 9/1999 | Cheung et al. ............ 709/250 |
| 6,564,267 B1 * | 5/2003 | Lindsay ................... 709/250 |
| 6,839,706 B2 * | 1/2005 | Spiers et al. ............... 707/4 |
| 2002/0069245 A1 * | 6/2002 | Kim ........................ 709/203 |
| 2002/0083131 A1 * | 6/2002 | Machida ................... 709/203 |
| 2003/0088711 A1 * | 5/2003 | Tabares et al. ............. 709/321 |
| 2003/0184782 A1 * | 10/2003 | Perkins et al. ............ 358/1.13 |
| 2003/0184784 A1 * | 10/2003 | Ferlitsch ................... 358/1.13 |
| 2003/0225931 A1 * | 12/2003 | Cheon et al. .............. 709/321 |
| 2004/0021906 A1 * | 2/2004 | Howard .................... 358/1.16 |
| 2004/0085572 A1 * | 5/2004 | Gomez ..................... 358/1.15 |

OTHER PUBLICATIONS

Silberschatz, Avi, Peter Galvin, and Greg Gagne; "Applied Operating System Concepts," First Edition, John Wiley & Sons, Inc., 2000; pp. 412-418,487-498,745-758.*

Tanenbaum, Andrew S., "Computer Networks," Third Edition, Prentice Hall PTR, 1996; pp. 1-73.*

* cited by examiner

*Primary Examiner*—Qing-Yuan Wu
(74) *Attorney, Agent, or Firm*—Lee & Hayes, PLLC

(57) ABSTRACT

Network device drivers that interface with a communication transport are described. In one aspect, a networked computing system includes the network device driver and the communication transport. The network device driver converts abstract network device calls to network hardware device specific calls. The network hardware device specific calls are transported from the network device driver via the communication transport to a network hardware device.

11 Claims, 6 Drawing Sheets

NETWORK DEVICE DRIVERS USING A COMMUNICATION TRANSPORT

TECHNICAL FIELD

The invention relates to computer systems and networking. More particularly, this invention relates to drivers used for computer systems and networking.

BACKGROUND

The use of corporate intranets, the Internet, and other complex networks has exploded over the past several years and continues to grow. People have become very comfortable with many services offered on the World Wide Web (or simply "Web"), such as electronic mail, online shopping, gathering news and information, listening to music, viewing video clips, looking for jobs, and so forth. One useful tool in networking involves the use of network device drivers that allow computers to interface with network hardware devices. Network device drivers often work by converting abstract calls (such as abstract Application Programming Interface [API] calls that are produced by a client) into hardware specific calls (e.g., hardware specific API calls) that can be understood by a network hardware device.

Relatively straight-forward network device drivers are most applicable to simple network configurations with relatively few servers, routers, links, and other such networking components. Unfortunately, as network configurations become more complex, the ability of network device drivers to effectively manage network configurations, and the ability of network device drivers to effectively perform their functions, is diminished. Much human interaction is often used to properly configure the network device drivers to ensure proper operation of the network. Accordingly, there is a need for improved techniques for designing and deploying network device drivers, especially in more complex networked systems.

SUMMARY

This disclosure relates to network device drivers that interface using a communication transport. In one embodiment, a networked computing system includes the network device driver and the communication transport. The network device driver converts abstract network device calls to network hardware device specific calls. The network hardware device specific calls are transported from the network device driver via the communication transport to a network hardware device.

BRIEF DESCRIPTION OF THE DRAWINGS

The same numbers are used throughout the specification to reference like features and components.

DETAILED DESCRIPTION

The following disclosure describes multiple embodiments of network device drivers for networked software applications using physical computing resources. In one embodiment, the network device driver is a software component that abstracts the functionality of a physical network hardware device to permit a software application to interact with the physical network hardware device without hardware specific knowledge.

Figure 1:
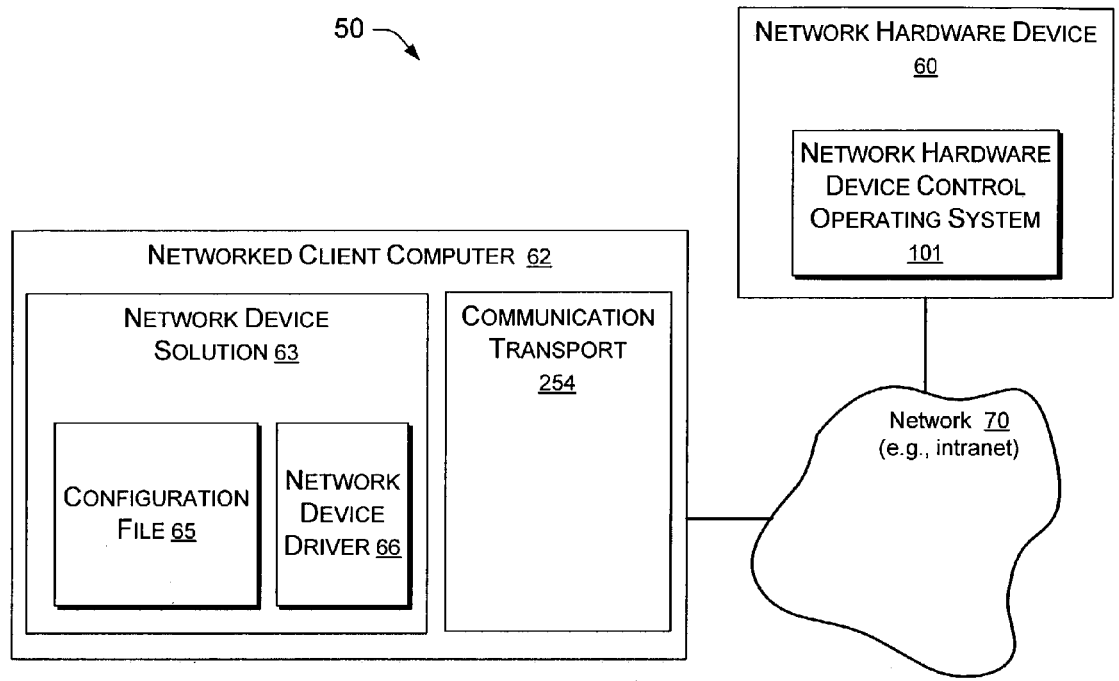
FIG. 1 is a block diagram of one embodiment of a computer environment including a network device driver and a communication transport.

One embodiment of a networked computer environment 50 is shown in FIG. 1. The networked computer environment 50 includes a networked client computer 62, a network hardware device 60, and a network 70. Certain embodiments of the networked client computer 62 include a network device solution 63 and a communication transport 254. One embodiment of the network device solution 63 includes a configuration file 65 and the network device driver 66.

The configuration file 65 contains information describing associations between the networked client computer 62 and each network hardware device 60. The information contained in the configuration file 65 is specific to each network hardware device 60 that it represents, information of the communication transport 254 (as shown in FIG. 1), and the software that is related to network management software 250 as described relative to FIG. 2. In one embodiment, the configuration file 65 provides information about the communication transport 254 to be used by the network device driver 66. As such, the relationship between the network device driver 66 and the network hardware device 60 is largely determined based on the information stored within the configuration file 65. The configuration file 65 is stored as an eXtensible Markup Language (XML) file that includes information relating to the network device driver 66 and the network hardware devices.

One illustrative example of the configuration file 65 that is provided for a specific network hardware device (e.g., an HP ProCurve530 which is produced and distributed by the Hewlett-Packard Company) is provided in Table 1. Other network hardware devices have similar configuration files that are modified appropriately.

TABLE 1

Illustrative Configuration File for Network Hardware Device in eXtensible Markup Language (XML)

```
<?xml version="1.0" encoding="utf-8" ?>
- <!-- Configuration file for the HP's ProCurve 5304XL Layer-2
switch - Oid 1.3.6.1.4.1.11.2.3.7.11.20-
->
- <device xmlns="http://schemas.microsoft.com/big/2003/device"
version="1">
    <description oem="HP" product="ProCurve" model="5304XL" />
<driverpath="Microsoft.Big.Resource.Network.Driver.HP.
ProCurve5304XL.dll" class="ProCurve5304XL" />
- <transports>
    <serial baud="9600" handshake="none" readdelay="100" writedelay=
"50" />
    <telnet ipv6="false" />
</transports>
```

TABLE 1-continued

Illustrative Configuration File for Network Hardware Device in eXtensible Markup Language (XML)

- <!-- Define device specific settings. -->
  </device>

The component of a network device driver 66 that provides for communication with the physical network hardware device can be the same over multiple network device driver implementations. The network device driver 66 is scalable to large and/or diverse networked computer systems such as exist on the corporate intranets, Internet, and other complex networked configurations. Certain embodiments of distributed networks include a plurality of server computers that each handle a portion of the processing tasks or memory tasks for a user or a Website provider. Distributed computing systems are considered as relatively complex due to the associated processing tasks, security aspects, memory tasks, and other networked considerations are divided between multiple server computers.

To perform the abstraction of the network device driver, the network device driver 66 is a software component which is written to convert between abstract network device Application Programming Interface (API) calls and network hardware device specific API calls. The abstract network device API calls can interface with applications using the networked client computer 62. The network hardware device specific API calls can interface directly with the network hardware device 60 using the communication transport 254 as the media for communicating with the network hardware. The network 70 can be configured to include (but is not limited to), e.g., a corporate intranet, the Internet, a variety of Local Area Networks (LANs), a variety of Wide Area Networks (WANs), and non networking medias such as RS-232 serial cabling. The network hardware device 60 may include one or more Network Hardware Device Control Operating Systems 101 as shown in FIG. 1.

Figure 2:
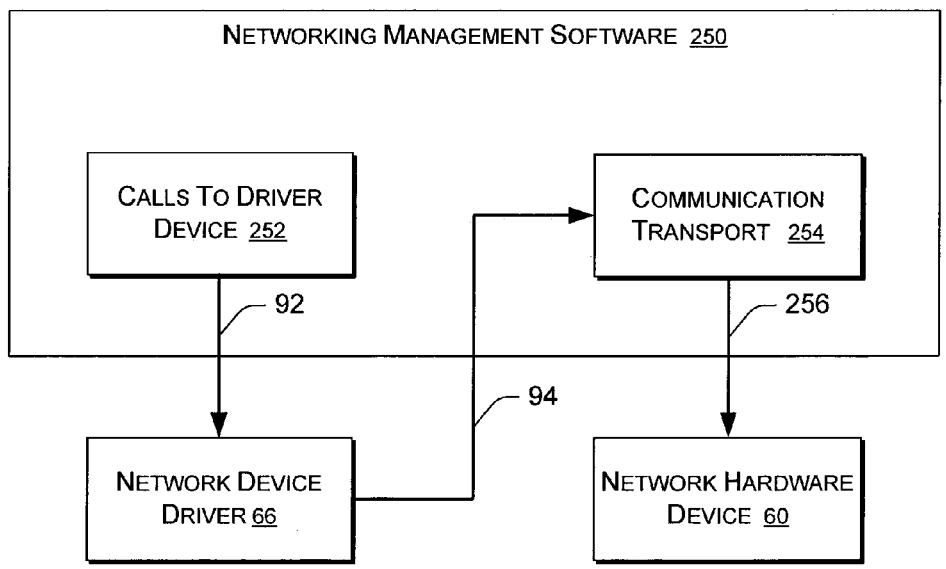
FIG. 2 is a block diagram of one embodiment of network management software that is associated with a network device driver and a network hardware device.

One embodiment of network management software portion 250 that provides for the association of the network device driver 66 to a network hardware device 60 is shown in FIG. 2. In different embodiments, the network management software 250 shown in FIG. 2 is contained within the network 70, within the networked client computer 62 of FIG. 1, or divided there between. In certain embodiments, the network management software 250 is a runtime environment that includes a "calls to driver device" portion 252 and a communication transport 254. In different embodiments, the communication transport 254 establishes a communication with the network hardware device and includes a telnet session, an HTTP session, or a session relating to another transport layer protocol. As such, the communication transport may be considered as a transport component that provides session communications with the network hardware device.

The network device driver 66 utilizes the communication transport 254 to make specific commands to the network hardware device. The use of the communication transport 254 that interfaces with (but is operationally distinct from) the network device driver 66 makes the network device driver more flexible to different network configurations. For example, assume that during operation of the computer environment 50 as shown in FIG. 1, the transport session between the communication transport 254 and the network hardware device 60 changes from a telnet session to an HTTP session. During this change, the configuration and operation of the network device driver 66 does not have to change. In many configurations, the communication transport 254 selects the actual media that is established between the network device driver 66 and the network hardware device.

In one embodiment, the "calls to driver device" portion 252 contains some software that can make API driver calls to the network device driver 66. The call to driver device by the calls to driver device portion 252 is envisioned to be one of many calls that an API driver can support. As shown in FIG. 2, the API driver calls 92 generated by the "calls to driver device" portion 252 that are transmitted to the network device driver 66 therefore are abstract calls. The network device driver 66 converts the abstract calls 92 that it receives from the calls to driver device 252 into specific API calls 94 that are directed to (and are able to interface directly with the hardware of) particular network hardware device(s) 60. The specific API calls 94 that are generated from the network device driver 66 to the communication transport are independent of the type of transport layer between the communication transport 254 and the network hardware device 60.

Based on the abstract API call 92 made to the network device driver 66 from the calls to driver device portion 252, the communication transport 254 sets up the aspects of the transport layer (including, e.g., ports of the network hardware device 60). The network device driver 66 uses the communication transport 256 to create a specific command (via the specific API call 94) that is directed via the communication transport 254 to the network hardware device 60.

One embodiment of the communication transport 254 acts as a proxy, in that it provides a set of methods that are translated into a specific protocol stream, and the specific protocol stream is forwarded as a specific API call 94 that is carried to the network hardware device over a communication path 256. The communication path may be, for example, can be based on telnet, HTTP, or some other transport level protocol. Prior to using the communication transport 254 (one embodiment of which is described relative to FIG. 2) to communicate API calls as described in this disclosure, the communication transport 254 can be created.

In one embodiment, the network hardware device 60 is a standalone device running a foreign operating system (OS), and therefore is not possible to execute code on the network device. The network hardware device 60 supports a native configuration protocol that the network device driver 66 (executing on Network Client Computer 62) uses the communication transport to interface with the network hardware device 60. The network device driver 66 can also be considered as a component that translates "Calls To Driver Device" 252 to the native configuration protocol supported by the network hardware device 60 using the communication transport as the media for exchanging the network hardware device native configuration protocol.

For each particular network hardware device 60, it is therefore important to determine the correct network device driver 66. As such, in one embodiment, the driver binding process 340 uses the configuration file 65 to determine (in many instances automatically, i.e., without any human input) the network device driver 66 applies to each particular network hardware device 60.

Once a network device driver 66 is selected, it is important to be able to interface with the network hardware device 60. In one embodiment, the actual mechanism to set up the communications between the network device driver 66 and the network hardware device 60 is not the network device driver itself. Instead, communications between the network device driver 66 and the network hardware device 60 involve the communication transport 254. In this manner, many embodiments of the network device driver 66 does not have to interface directly with the hardware of the network hardware device 60, but instead interfaces using they communication transport 254.

The driver binding process 340 includes 342, which is a request to bind the network device driver 66 to the network hardware device 60 as shown in FIG. 1. The remainder of the driver binding process 340 may be considered as binding the network device driver 66 to the network hardware device 60 (and opening the network device driver) that is in response to the request to bind the network device driver 66 to the network hardware device 60 as shown in FIG. 1.

Figure 3:
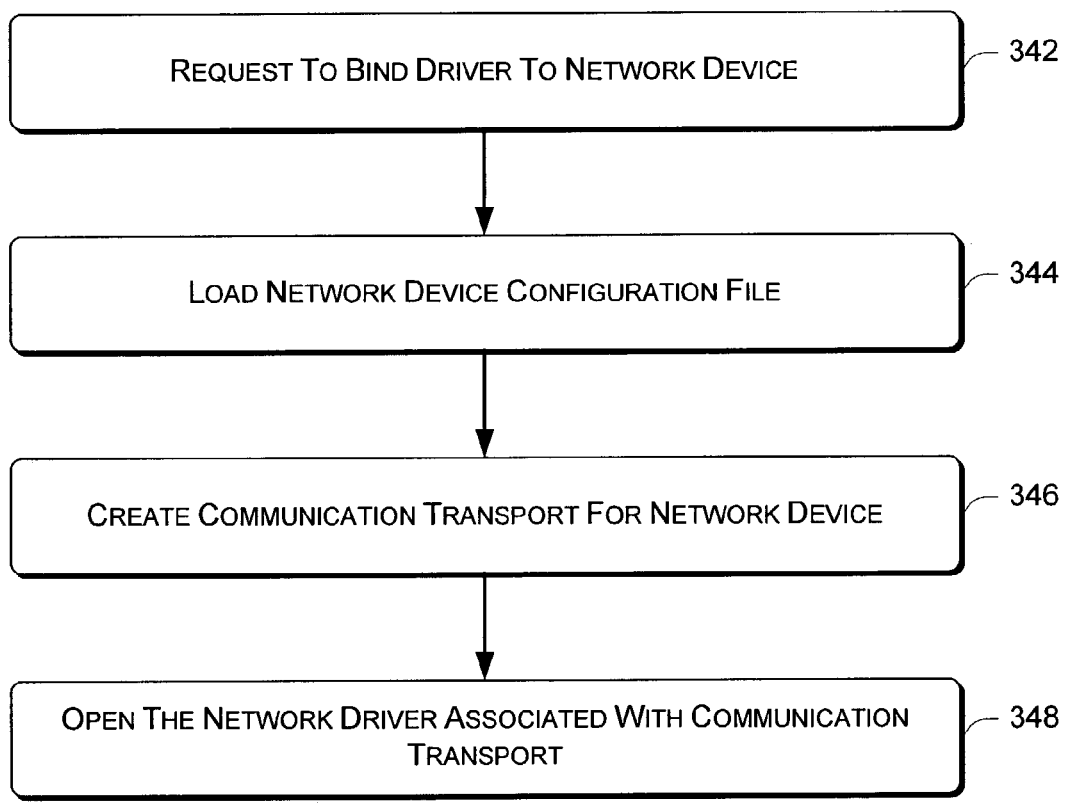
FIG. 3 is a flow chart of one embodiment of a process that binds a network device driver to a communication transport.

One embodiment of the creation of the communication transport 254 is now described relative to a driver binding process 340 as described herein relative to FIG. 3. One embodiment of the driver binding process 340 includes a request to bind the network device driver 66 (with a communication transport 254) to a particular network hardware device 60. Within different embodiments, the request to bind can be performed using a variety of different mechanisms such as "on demand" (e.g., when an application desires to communicate with network hardware device), automatically, within a prescribed time duration, automatically after a certain amount of traffic traverses the network, or using some other triggering mechanism.

The driver binding process 340 continues to 344 in which the network device configuration file 65 (one embodiment shown in FIG. 1) is loaded. Each network device solution 63 has a distinct Object Identifier (OID) associated therewith by which such networks as intranets and the Internet can positively identify that network device solution. It is envisioned that there are a variety of mechanisms that can be used to link network hardware devices including configuration files using the OIDs. However, any known mechanism that links the network hardware devices are intended to be within the intended scope of the present disclosure. In addition, each network hardware device 60 is also provided with a unique identifier. The OID is used in certain embodiments of the present disclosure to bind the network device driver 66 to the network hardware device 60. In one embodiment, the appropriate network hardware device 60 value is determined based on the OID of the network hardware device.

The configuration file 65 contains information describing how to build and/or generate the communication transport 254. The driver binding process 340 continues to 346 in which the network management software portion 250 as shown in FIG. 2 creates the communication transport 254 for a particular network hardware device 60 based on the information contained in the configuration file 65. In one embodiment, the communication transport 254 is created within the network management software 250 as shown in FIG. 2. In one embodiment, the communication is created by the network management software and provided to the network device driver. One embodiment of a communication transport would provide asynchronous Input/Output and diagnostic tracing support. The communication transport 254 is created for one network hardware device 60. Therefore, one communication transport 254 is envisioned to be "created" for each network hardware device in one embodiment.

The driver binding process 340 continues to 348 in which the network driver device 66 that is associated with the communication transport 254 is opened (using an OPEN call in one embodiment), thereby providing the communication transport to be used for communications. The OPEN call is a high level API call that is used to pass a pointer to the communication transport 254 (or an indicator of the communication transport, or the communication transport itself) to the network device driver 66. Once the OPEN command is applied in which the network device driver is opened in 348, the binding process requested in 342 is completed. Following the OPEN command, the network device driver 66 has a link to the communication transport 254 that it can use to communicate with the network hardware device 60. FIG. 2 shows an established network configuration that uses the network hardware device 60 as established using the embodiment of driver binding process 340 shown in FIG. 3.

Following the driver binding process as described relative to FIG. 3, the network device driver 66 is bound to at least one network hardware device 60 via the communication transport 254, and the normal operation of the network management software 250 can then provide network communications as described relative to FIG. 2.

Such binding of the network device driver 66 to the network hardware device 60 can in certain embodiments of the present disclosure occur automatically within a computer environment as described relative to FIG. 3. Alternatively, network management techniques can allow a network manager (i.e., human) to configure the network device driver 66 and the communication transport 254 as desired. The level that the binding process that is automated can be determined by the user in certain embodiments.

Along with greater acceptance of such networks 70 as intranets and the Internet (that all require a very large number of networked client computers) comes an associated interference with the increased number of network hardware devices (such as server computers, routers, hubs, switches, etc.) that are used to provide services to users. As such, the network device driver 66 can be configured to adapt to a greater variety of networked configurations. Increasing the configuration of the network device driver (and the topology of the network itself) acts to reduce the amount of network manager and other human involvement in configuring the network. As networked systems become larger and faster, more complex network configurations (such as enterprise networks) become inevitable, and the importance for an automated system to provide network device drivers 66 becomes more pronounced.

Figure 4:
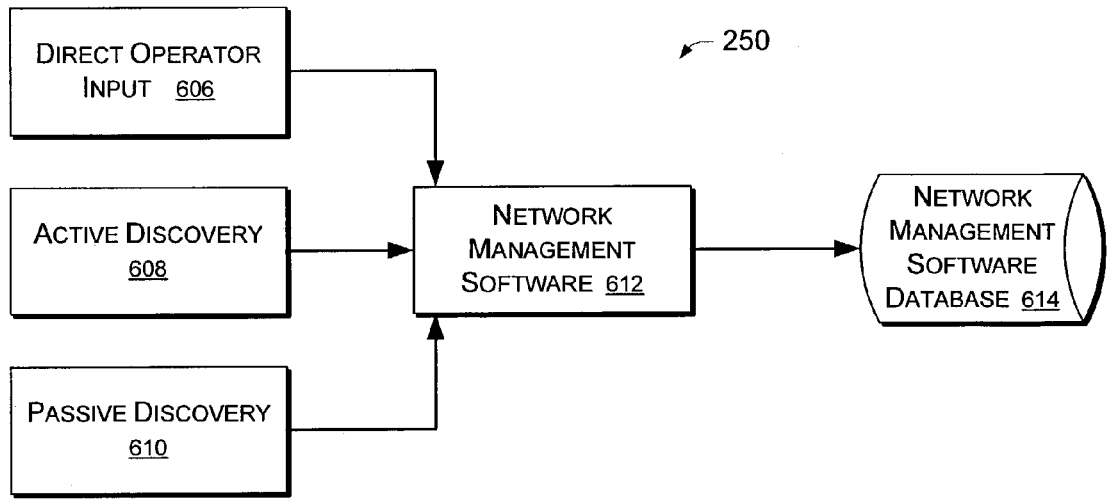
FIG. 4 is a block diagram of one embodiment of a network management software system.
Figure 5:
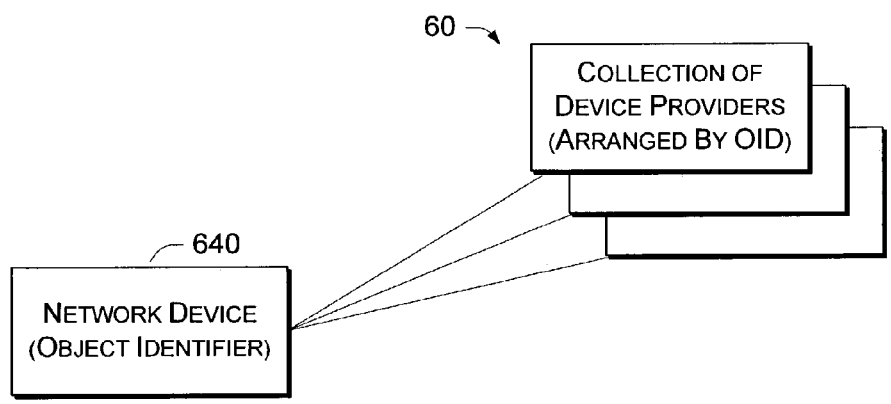
FIG. 5 is a diagram of one embodiment of associating one network hardware device to a collection of device providers using an Object Identifier (OID)

FIGS. 4 and 5 provide an embodiment of a mechanism by which network management software can uniquely identify network hardware devices (and other desired network components) using OIDs. FIG. 4 shows one embodiment of a network management software section 250 that includes a direct operator input portion 606, an active discovery portion 608, a passive discovery portion 610, a network management software portion 612, and a network management software database 614. The network management software section 250 (certain embodiments described relative to FIGS. 2 and 4) obtains knowledge of all network hardware devices and the wiring topology between the network hardware devices and the network hardware of the computers (such as the embodiment of the networked client computer 62 shown in FIG. 1 or the embodiment of the servers 102 shown in FIG. 6). Independent from the source, the network management software section 250 uses this knowledge to load software from the appropriate network hardware device providers and to perform multi-device updates that depend on the wiring topology of the managed network domain.

The embodiment of network management software 612 as shown in FIG. 4 assumes knowledge of all network hardware and the wiring topology between network hardware devices and the network hardware of the client computer. The network management software 612 uses this knowledge to load the appropriate network hardware device providers and to perform multi-device updates that depend on the wiring topology of the managed network domain. The collection of network hardware and topology within the managed network domain can be obtained by direct operator input, active discovery or passive discovery.

The collection of network hardware and topology within the managed network domain is obtained by direct operator input from the direct operator input portion 606, active discovery from the active discovery portion 608, or passive discovery from the passive discovery portion 610. The network management software API is called to register a network hardware device or computer and specify topology information.

In one embodiment, the direct operator input portion 606 provides direct operator input for network management of network hardware devices 60 as shown in FIG. 2. By using the direct operator input, the operator can directly specify the network hardware device and topology via a network management tool that will call the appropriate network management software APIs 612 to register the network hardware device or computer and specify topology information. This section relates to the high level management component of the network management software. The network management software APIs 612 are external public APIs that define the network topology to the network management software. In one embodiment, a development tool is provided to import and export the managed network domain configuration in XML format.

The active discovery portion 608 can provide active discovery for network management of network hardware devices by, in certain embodiments, including the process of "pinging" a known range of IP addresses. Pinging provides for the discovery of the existence of associated network hardware devices, and then a Simple Network Management Protocol (SNMP) query is used to obtain specifics on the device.

The passive discovery portion 610 can, in certain embodiments, provide passive discovery for network management of network hardware devices. Passive discovery includes the process of listening to network traffic to identify new network and/or computer devices. When a new device is detected, a Simple Network Management Protocol (SNMP) query is performed to obtain specifics on the device.

One embodiment of the present disclosure provides a mechanism for positively identifying network hardware devices using SNMP devices and techniques (e.g., involving Management Information Bases (MIBs)). In one embodiment, all network and computer resources within the network management domain support the SNMP MIB-II (RFC 1213—incorporated by reference in its entirety) standard. The "system" group within the MIB-II (RFC 1213) standard specifies a "sysObjectID" which uniquely identifies the device (network or computer). The complete description of the "sysObjectID" is also provided within the RFC-1213.

"The vendor's authoritative identification of the network management subsystem is contained in the entity. This value is allocated within the SMI enterprises subtree (e.g., 1.3.6.1.4.1) and provides an easy and unambiguous means for determining 'what kind of box' is the network hardware device that is being managed. For example, if an exemplary vendor 'Flintstones, Inc.' was assigned the subtree using the network hardware device's Object Identifier (OID), e.g., 1.3.6.1.4.1.4242, it could assign the OID of an included node, such as 1.3.6.1.4.1.4242.1.1, to one of its network hardware devices, e.g., 'Fred Router'.

Since the network hardware device's Object Identifier (OID) 640 is unique to each network hardware device 60 as shown in FIG. 5, this value is used to locate the matching network hardware device provider (also referred to as driver solution). As such, each network hardware device 60 is referenced by a unique OID 640. Table 2 shows examples of a plurality of exemplary OIDs.

TABLE 2

Exemplary Object Identifiers for Network Hardware Devices

| Device | Network Hardware Device Object Identifiers (OID) |
|---|---|
| Cisco Catalyst 2900XL | 1.3.6.1.4.1.9.1.220 |
| Cisco Catalyst 3550 | 1.3.6.1.4.1.1991.1.3.24.4 |
| Foundry BigIron 8000 | 1.3.6.1.4.1.1991.1.3.7.2 |
| Foundry FastIron 1500 Switch | 1.3.6.1.4.1.1991.1.3.24.1 |
| HP ProCurve 5304XL Switch | 1.3.6.1.4.1.11.2.3.7.11.20 |

These appendices are provided in this disclosure to provide embodiments of Application Programming Interfaces (APIs) that can be used by the computer environment 50 as shown in FIG. 1. APPENDIX I represents exemplary code (in the form of APIs) for one embodiment of the network device driver that defines an IDriverDevice interface for abstracting all network hardware devices as shown in Appendix I. This API shown in APPENDIX I can be exposed by network device driver 66 when running a computer. The network device driver 66 is therefore an instance of an object as set forth by the IDriverDevice.cs class.

APPENDIX II represents exemplary code in the form of APIs that are associated with one embodiment of the driver switch that defines the interface for communicating with network layer-2 switch device drivers. Therefore, in one embodiment, the driver switch is an instance of an object as set forth by the IDriverSwitch.cs class. While the APPENDIX II code is directed to an interface for a network switch as one embodiment of network hardware device 60, it is envisioned that different embodiments of network hardware devices such as routers, load balancers, etc. will have a similar interface (and therefore similar APIs) as that illustrated in APPENDIX II.

APPENDIX III represents exemplary code (in the form of APIs) for one embodiment of the communication transport 254 as described in this disclosure relative to FIGS. 1 and 2. These APIs represent one embodiment of the base interface used for communications with the network hardware devices. Therefore, in one embodiment, the communication transport 254 described relative to FIG. 2 is an instance of an object as set forth by the ITransport.cs class, one embodiment as set forth in APPENDIX III.

The creation of different custom network topologies for varied applications hosted on the same computing system can benefit from the automatically generated network device drivers 66 as disclosed herein. Such automatically generated network device drivers 66 and automatically generated network topologies are particularly helpful for large datacenters, which are complex and often called upon to host multiple applications. Distributed applications, such as installed at prior-art datacenters, often have complex networking requirements, and building physical network topologies to conform to these requirements can be a cumbersome, time consuming process that is prone to human error. Enabling automatic generation of network device drivers 66 and virtual network topologies that do not require physical re-configuration of the computing system for each deployed application (e.g., rerouting wiring, physically connecting computers to various switches, etc.) reduces the dependence on human-centric operations, thereby reducing costs and the likelihood of human error.

Figure 6:
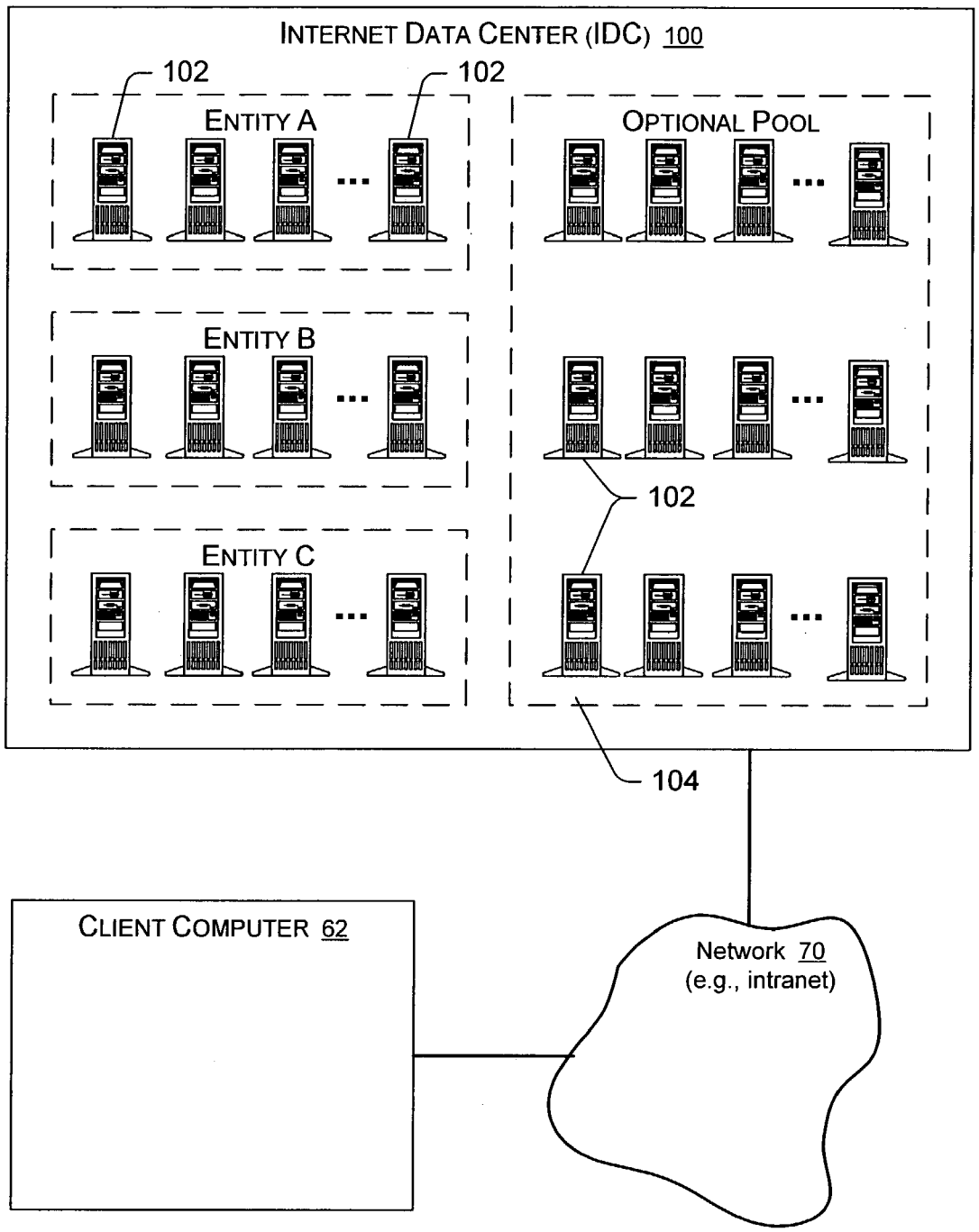
FIG. 6 is a block diagram of one embodiment of a computer environment configured as an Internet data center (IDC)

One embodiment of a network 50 includes an Internet data center (IDC) 100 as shown in FIG. 6. The IDC 100 is a specifically designed complex that houses many server computers 102 for hosting Internet-based services. IDCs 100 (that also go by such names as "Webfarms" and "server farms") typically house hundreds to thousands of server computers 102 in climate-controlled, physically secure buildings. These server computers 102 are interconnected and networked to run one or more programs supporting one or more intranet or Internet services or websites. Automating the set up of the communications between the computer device as provided by certain embodiments of the present disclosure has become especially important for such complex computer systems as IDCs. IDCs 100 provide reliable intranet/Internet access, reliable power supplies, and a secure operating environment. Another type of networked computer system is an enterprise data centers (EDC). EDCs are similar to IDCs, but are targeted to enterprise networks.

The embodiment of IDC 100 shown in FIG. 6 has many server computers 102 (that may be, for example, arranged in a specially constructed room). The server computers 102 are general-purpose computers, and are typically configured as servers although other types of computers such as PCs, mainframes, etc. can be substituted. One embodiment of the IDC 100 may be constructed to house a single site for a single entity (e.g., a data center for Yahoo! or MSN), or to accommodate multiple sites for multiple entities (e.g., an Exodus center that host sites for multiple companies). The IDC 100 is illustrated with a plurality of entities-entity A, entity B, and entity C. Each entity shares the computer resources. In one aspect, these entities represent various companies that want a presence on the Web.

The present disclosure provides a mechanism to generate network device drivers that can interact with, and be bound to, a network hardware device. Such configuration of network hardware devices can be performed automatically to arbitrarily generate a variety of network configurations based on the network device driver configuration. Arbitrary network topologies in which physical network hardware devices such as those in IDCs 100 as shown in FIG. 6 can be virtually arranged to automatically create virtual networks is described in U.S. patent application Ser. No. 10/382,942 entitled "Virtual Network Topology Generation", Hydrie et al. which was filed on Mar. 6, 2003 (incorporated herein by reference in its entirety).

Figure 7:
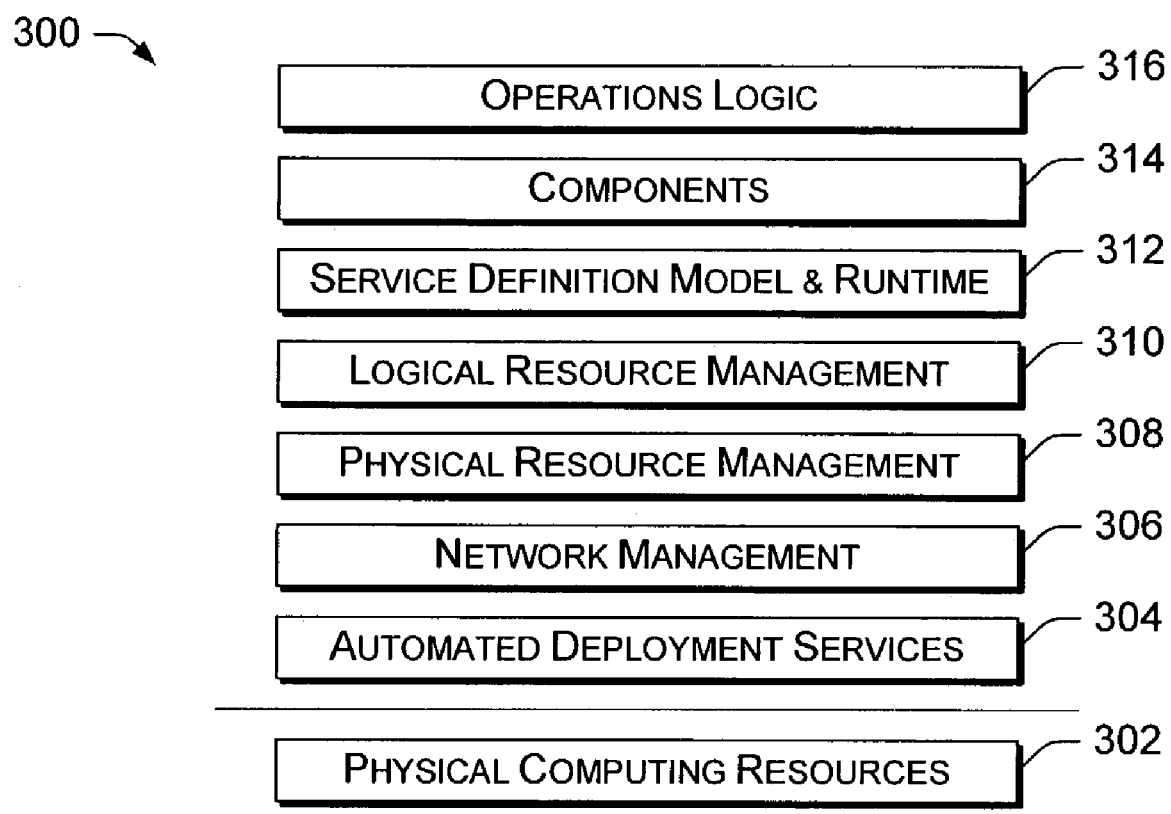
FIG. 7 is a layered diagram of one embodiment of a platform architecture for a networked computing system.

FIG. 7 shows one embodiment of a platform architecture 300 for automating design, deployment, and management of networked applications on a networked computing system 200. The binding of network device drivers to network hardware devices as described relative to FIGS. 1 and 3 occurs primarily in the physical resource management layer 308 (as described in this disclosure relative to FIG. 7). The architecture 300 shows multiple layers atop a base layer 302 that represents the physical computer resources of the networked computing system 200. An automated deployment services layer 304 provides tools to convert machines into servers used in the networked computing system 200. Such tools allow creation, editing, and deployment of OS (operating system) images. The remote programming of the machine is accomplished using fully programmatic interfaces, such as WMI (Windows Management Instrumentation), which is an Application Programming Interface (API) in Microsoft's Windows® operating systems that allows system and network hardware devices to be configured and managed.

A network management layer 306 sits atop the automated deployment services layer 304. The network management layer 306 allows for network management and virtual topology generation. In part, the network management layer supports a driver model for network computers that facilitates the connection of individual computers to one or more VLANs via a single physical network interface connected to an associated port of the network hardware devices such as network switches. According to the driver model, a VLAN driver is installed at the server and used to create virtual network interfaces (VNICs) above the single physical network interface. The VLAN driver creates one virtual network interface (VNIC) for each VLAN. The VNICs reside just above the network interface (NIC) in the IP stack at the server so that the server can handle packets passed over more than one VLAN, even though all packets physically travel through the same physical NIC.

The driver model enables configuration of VLAN tagging on switch ports to allow data packets that are passed over the networked computing system to be tagged with identities of the VLAN to which they belong. The network hardware devicees 60 enforce the tagging and only accept packets with tags identifying the VLANs to which the switches belong. In one implementation, the network hardware devicees 60 have both tagged ports and non-tagged ports. Tagged ports of a switch are tagged with VLANs identifiers and used for connection to tagged ports of other switches. This allows rapid transfer of packets through the network of switches. Untagged ports of a switch are used for connection to the servers or computers. When packets reach their destination server's switch port, VLAN tags are stripped from the packets prior to communicating the packets upstream to the servers so that the servers need not know anything about the tagging.

A physical resource management layer 308 resides atop the network management layer 306. The physical resource management layer 308 maintains a physical model of the networked computing system, tracking ownership and coordinating allocation of all physical computing resources. In one embodiment, the network management software portion 612 as described relative to FIG. 4 in this disclosure falls within the physical resource management layer 308 as described relative to FIG. 7. The physical management layer 308 further supports driver binding, and batched resource allocation, thereby enabling dynamic configuration and management of physical computing resources.

A logical resource management layer 310 sits atop the physical resource management layer 308. The logical resource management layer 310 facilitates allocation of logical resources requested by the networked application. For instance, the application might call for such resources as databases, load balancing services, firewall, web services, and so forth. The logical resource management layer 310 exposes such logical resources.

The next layer is the service definition model and runtime layer 312, which allows description of the networked application and tracking of its operation. The service definition model (SDM) provides a namespace and context for describing operations processes and an API for application introspection and control of application resources. It further enables operators and developers to share common application views.

The sixth layer atop the computing resources layer 302 is the components layer 314. This layer permits definition of reusable building blocks of a networked application, which use the SDM APIs for context, naming, and binding. These building blocks are referred to as "components".

The top layer is the operations logic layer 316, which accommodates the operational aspects of the networked application. The operations logic is responsible for starting a service, growing and shrinking the service, upgrades and downgrades, fault detection and recovery, and state partitioning. The operations logic enables reuse of proven operational practices across deployments and applications. Through use of the SDM layer, the operations logic has context to better understand issues that may arise. For instance, when a failure occurs, the operations logic can determine that the failure occurred at the front-end of an email service, rather than just at some server in the middle of the room.

Figure 8:
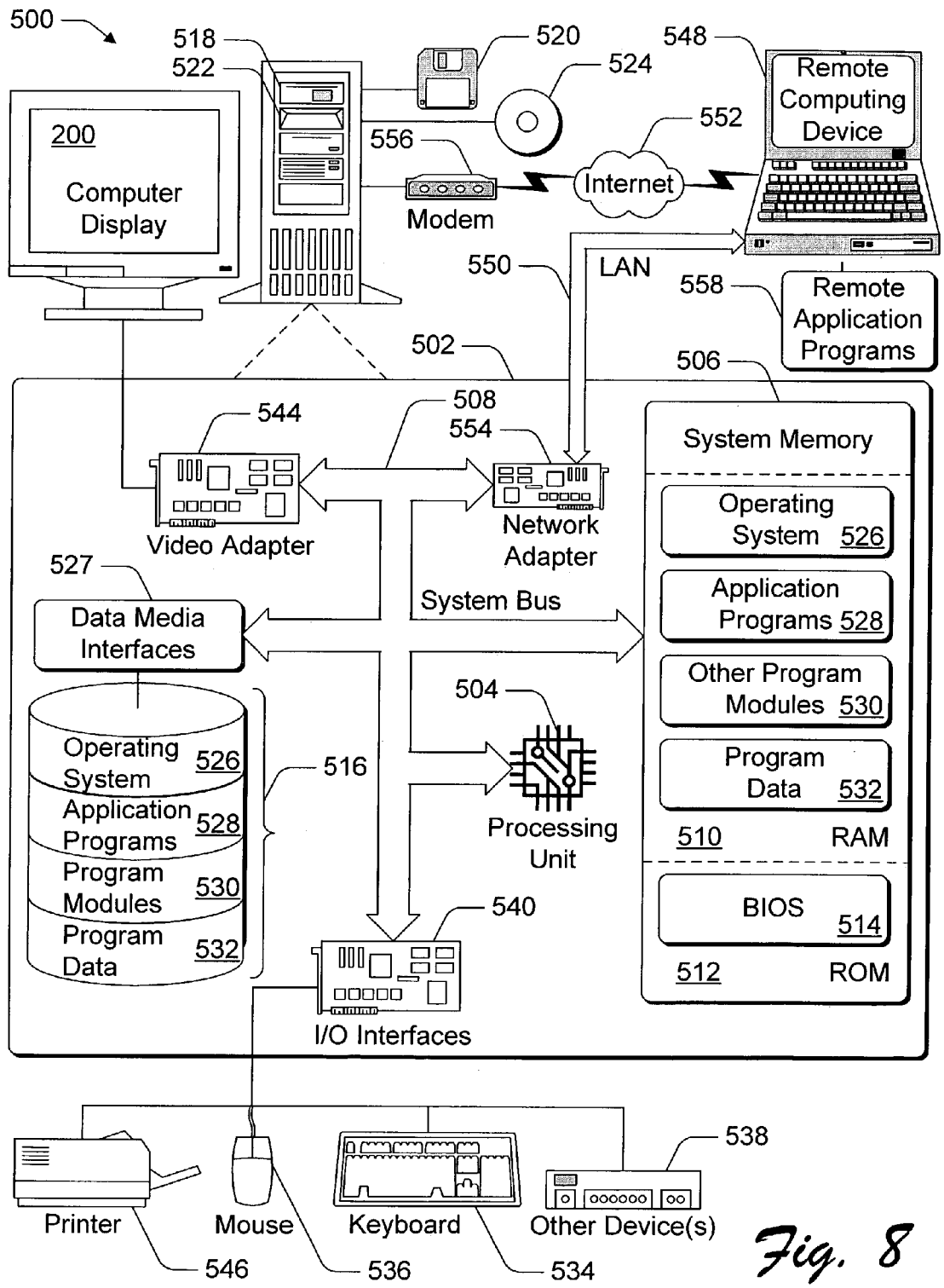
FIG. 8 is a block diagram of one embodiment of a computer environment such as can include a network device driver.

FIG. 8 illustrates an example of a suitable computer environment or network 500 which includes network driver devices that can be bound to network hardware devices as described relative to FIGS. 1 and 3 of this disclosure. Similar resources may use the computer environment and the processes described herein.

The computer environment 500 illustrated in FIG. 8 is a general computer environment, which can be used to implement the techniques described herein. The computer environment 500 is only one example of a computer environment and is not intended to suggest any limitation as to the scope of use or functionality of the computer and network architectures. The embodiment of the computer environment 500 as described herein represents one embodiment of computer environment 50 as described relative to FIG. 1. The computer environment 500 should not be interpreted as having any dependency or requirement relating to any one or combination of components illustrated in the exemplary computer environment 500.

The computer environment 500 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (optionally: including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 8 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 515, a removable magnetic disk 520, and a non-volatile optical disk 524, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 500.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of computer display 200 can also be connected to the system bus 508 via an interface, such as a video adapter 544. In addition to the computer display 200, other output peripheral devices can include components such as speakers (not shown) and a printer 546 which can be connected to the computer 502 via the input/output interfaces 540.

Computer 502 can operate in a networked environment using logical connections to one or more remote computers, such as a remote computer device 548. By way of example, the remote computer device 548 can be a personal computer, portable computer, a server, a router, a network computer, a peer device or other common network node, game console, and the like. The remote computer device 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer environment 500, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Typically, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the systems and processes have been described in language specific to structural features and/or process, it is to be understood that the invention defined in the appended claims is not necessarily limited to the specific features or steps described. Rather, the specific features and steps are disclosed as preferred forms of implementing the claimed invention.

Appendix I: IDriverDevice.cs public interface IDriverDevice

The IDriverDevice interface abstracts network hardware device configuration.

The IDriverDevice interface provides an interrelation between the IDriverDevice, the IDriverSwitch, the IDriverRouter, the IDriverFirewall, and the IDriverLoadBalancer.

bool MustReset {get;}

The MustReset process is used to determine if a reset of the device is required to apply settings. For example, some devices require a reset after changing the IP address. MustReset returns True if the Reset method is called to apply the change.

The MustReset property can only be set true while pre-setup initialization of a network hardware device.

bool MustSave {get;}

The MustSave process is used to determine if the current configuration has been changed. If MustSave is true, the ConfigurationSave( ) method should be used to persist settings over a reboot. MustSave returns True if configuration changes were made since the last save.

DriverState State {get;}

The DriverState.State process gets and sets the driver state.

void Close( )

The Close process logs off from the network hardware device.

void Open(XmlNode settings, ITransport transport, IDriverCredential credential)

The Open process opens the device driver with the specific settings from the device's XML configuration file as the XmlNode instance.

void Reset( )

The Reset process resets the network hardware device, and will cause the network hardware device to reboot and reload configuration settings from the default location.

void SaveConfiguration( )

The SaveConfiguration process saves the current configuration to the default non-volatile memory location. This is the configuration location used on a powerup reboot or reset. The dirty property 'MustSave' is set to false.

Appendix I: IDriverDevice.cs (cont'd.)

void SetConfiguration(DriverDeviceConfiguration configuration)

The SetConfiguration process sets the configuration of the network hardware device.

The SetConfiguration API has one parameter, "configuration." With <param name="configuration">the device configuration is set.

Appendix II: IDriverSwitch.cs public interface IDriverSwitch:IDriverDevice

The IDriverSwitch interface abstracts layer-2 switch configuration which involves software for devices such as the IDriverDevice, the IDriverSwitch, and the IDriverRouter.

Int DefaultVlanId {get;}

The DefaultVlanId process returns the VLAN identifier that represents the default VLAN. In one embodiment, the returned value is in the range of 1.4095.

DriverAddress ManagementIPAddress {get; set;}

The DriverAddress ManagementIPAddress process gets or sets the management IP address and subnet mask of a device.

IPAddress ManagementIPGateway {get; set;}

The IPAddress ManagementIPGateway process gets or sets the management IP default gateway of a device.

int MaxVlans {get;}

The int MaxVlans {get;} process gets the maximum number of VLANs supported by this device.

int UpperVlan {get;}

The UpperVlan process gets the upper VLAN id range supported by the device.

void AttachPortToVlan(string portName, int vlanId, bool tagged)

The AttackPortToVlan process attaches a specific switch port to a VLAN as tagged or untagged.

The AttackPortToVlan process includes three parameters: portName, vlanId, and tagged.

---

<param name="portName">Port on the switch to attach.
<param name="vlanId">VLAN to attach port to.
<param name="tagged">Indicates if the port is in tagged or untagged mode.

--- void CreateLayer2Vlan(int vlanId, string vlanName)

The CreateLayer2Vlan process creates a 802.1q VLAN on the layer-2 switch.

The CreateLayer2Vlan process includes two parameters: vlanId and vlanName.

---

<param name="vlanId">VLAN tagged identifier to create.
<param name="vlanName">Optional name of the VLAN to create.

---

Appendix II: IDriverSwitch.cs (cont'd.)

void DeleteLayer2Vlan(int vlanId)

The DeleteLayer2Vlan process deletes an existing 802.1q VLAN from the layer-2 switch. Any attached ports are automatically released. The DeleteLayer2Vlan process includes one parameter vlanId wherein <param name="vlanId">VLAN identifier to delete.</param> void DetachPortFromVlan(string portName, int vlanId, bool tagged)

The DetachPortFromVlan process detaches a device port from a VLAN. The DetachPortFromVlan process includes three parameters: portName, vlanId, and tagged.

---

<param name="portName"> acts to detach port.
<param name="vlanId">acts to detach port from VLAN
<param name="tagged">Indicates if the port is in tagged or untagged mode.

--- void EnablePortTaggedMode(string portName, bool tagged)

The EnablePortTaggedMode process sets the tagged mode on a port.

The EnablePortTaggedMode process includes two parameters: portName and tagged.

---

<param name="portName">Port to enable/disable tagged mode.
<param name="tagged">Indicates the new tagged mode to set.

---

GetPort(string portName)

The GetPort process returns an IDriverPort instance that represents a snapshot (copy) of the port specified by interface name.

The GetPort process includes one parameter: portName.

<param name="portName">Port to retrieve status of IDriverPort

GetVlan(int vlanId)

The GetVlan process returns a collection of all ports by its interface name "DriverPortNameCollection GetPortNames( )"

The GetVlan process returns an IDriverVlan interfaces that represents a snapshot (copy) of the specified VLAN state on the device.

The GetVlan process includes one parameter: vlanId.

<param name="vlanId">VLAN to retrieve status of IDriverVlan

DriverVlanIdCollection GetVlanIds( )

The GetVlanIds process returns a collection of all VLANs by identifier (1 to 4095).

Appendix II: IDriverSwitch.cs (cont'd.)

int Ping(IPAddress ip)

The Ping process issues a remote ping from the switch to the target IP address.

The Ping process includes one parameter: ip.

<param name="ip">IP address to ping from the switch.

The Ping process returns the time (in milliseconds) of the returned echo.

bool QueryLayer2VlanExist(int vlanId)

The QueryLayer2VlanExist process queries for the existances of a 802.1q VLAN on the layer-2 switch.

The QueryLayer2VlanExist process includes one parameter: vlanId.

<param name="vlanId">VLAN identifier to query for.

The QueryLayer2VlanExist process returnsTrue if found, or else returns false.

void SetPortEnabled(string portName, bool enable)

The SetPortEnabled process enables or disables a port on the device.

The SetPortEnabled process includes two parameters: portNasme and enable.

---

<param name="portName">Port to enable or disable.
<param name="enable">New enable/disable state of the port.

---

APPENDIX III: ITransport.cs public interface ITransport:IDisposable

ITransport is the base interface for a number of transport related interfaces used to define the physical communication path from PC running the device driver code to the network hardware device.

int Available {get;}

The Available process gets the amount of data that has been received from the transport and is available to be read.

bool Logging {get; set;}

The Logging process gets or sets a value indicating whether this transport writes debugging logging information to any installed trace listeners. Logging is general raw data dumps of communications to/from the network hardware device.

int ReceiveTimeout {get; set;}

The ReceiveTimeout process gets or sets the amount of time a transport will wait to receive data once a read operation is initiated.

The ReceiveTimeout value is the time-out value of the connection in milliseconds The default value is 0.

The ReceiveTimeout property determines the amount of time that the Read method will block until it is able to receive data. This time is measured in milliseconds. If the time-out expires before Read successfully completes, the transport will throw a TransportTimeoutException. There is no time-out by default.

int SendTimeout {get; set;}

The SendTimeout process gets or sets the amount of time a transport will wait for a send operation to complete successfully.

The value of the SendTimeout is the send time-out value, in milliseconds. The default is 0.

The SendTimeout property determines the amount of time that the Send method will block until it is able to return successfully. This time is measured in milliseconds.

APPENDIX III: ITransport.cs (cont'd.)

IAsyncResult BeginRead(byte[ ] buffer, int offset, int size, AsyncCallback callback, object state)

The BeginRead process begins to asynchronously receive data from a connected transport. The BeginRead process includes five parameters: buffer, offset, size, callback, and state.</summary>

---

<param name="buffer">The storage location for the received data.
<param name="offset">The zero-based position in the buffer parameter at which to store the received data.
<param name="size">The number of bytes to read.
<param ///name="callback">The delegate to call when the async call is complete.
<param name="state">An object containing information supplied by the client.

---

The BeginRead process returns An IAsyncResult representing the asynchronous call.

IAsyncResult BeginWrite(byte[ ] buffer, int offset, int size, ///AsyncCallback callback, object state)

The BeginWrite process writes data asynchronously to a connected transport.

The BeginWrite process includes five parameters: buffer, offset, size, callback, and state.

---

<param name="buffer">The location in memory that holds the data to send.
<param name="offset">The location in buffer to begin sending the data.
<param name="size">The size of buffer.
<param name="callback">The delegate to call when the async call is complete.
<param name="state">An object containing information supplied by the client.

---

The BeginWrite process returns An IAsyncResult representing the asynchronous call.

void EndRead(IAsyncResult asyncResult)

The EndRead process handles the end of an asynchronous read.

The EndRead process includes one parameter: asyncResult.

<param name="asyncResult">An IAsyncResult representing an asynchronous call.

The EndRead process returns the number of bytes read from the transport.

void EndWrite(IAsyncResult asyncResult)

The EndWrite process handles the end of an asynchronous write. The EndWrite process includes one parameter "asynchResult.

---

<param name="asyncResult">The IAsyncResult representing the asynchronous call.

---

APPENDIX III: ITransport.cs (cont'd.)

int Read(byte[ ] buffer, int offset, int count)
  The Read process reads data from the communication transport. The Read process includes three parameters: buffer, offset, and count.

---

<param name="buffer">The location in memory to store data read from the stream.
<param name="offset">The location in the buffer to begin storing the data.
<param name="count">The number of bytes to read. The Read process returns the number of bytes read from the stream.

--- void Write(byte[ ] buffer, int offset, int size)
  The Write process writes data to the stream.
  The Write process includes three parameters: buffer, offset, anhd size.

---

<param name="buffer">The data to write to the stream.
<param name="offset">The location in the buffer to start writing data from.
<param name="size">The number of bytes to write.

---

The invention claimed is:

1. At least one computer storage medium storing a device driver system, the device driver system comprising:
   a configuration file to store data regarding a communication transport to establish communication with a network hardware device and to include a session relating to a transport layer protocol, the configuration file to further store information describing how to generate the communication transport;
   a network device driver to convert abstract network device calls to network hardware device specific calls for the communication transport based on the data provided by the configuration file; and
   a driver binding component to:
     request to bind the network device driver to the network hardware device;
     create and load the communication transport in response to the request and based on the information stored in the configuration file;
     open the network device driver associated with the communication transport utilizing an open call that is used to pass a pointer to the communication transport; and
     bind, in response to the open call, the network device driver to the network hardware device via the communication transport.

2. The at least one computer storage medium of claim 1, wherein the network device driver is included in a network device solution portion that has an object identifier (OID) associated therewith.

3. A driver binding method, comprising:
   loading a network device configuration file to provide data regarding a network hardware device and a session relating to a transport layer protocol, the network device configuration file storing information describing how to generate a communication transport;
   requesting to bind a network device driver to the network hardware device;
   creating and loading, based at least in part on information contained in the network device configuration file, the communication transport to establish communication with the network hardware device;
   opening the network device driver that uses the communication transport for affecting communications with the network hardware using the communication transport by utilizing an open call that is used to pass a pointer to the communication transport; and
   binding, in response to the open call, the network device driver to the network hardware device via the communication transport.

4. The method of claim 3, wherein the network device driver converts abstract network device Application Programming Interface (API) calls to specific API calls for the network hardware device.

5. The method of claim 3, wherein the configuration file is an extensible Markup Language file.

6. The method of claim 3, wherein a composite of the configuration file and the network device driver has an Object Identifier (OID) associated therewith.

7. At least one computer storage medium having computer executable instructions stored thereon that, when executed by one or more processors, causes the one or more processors to:
   request to bind a network device driver to a network hardware device;
   implement, in response to the request, an independent communication transport that provides a set of methods to the network hardware device;
   open the network device driver associated with the independent communication transport utilizing an open call that is used to pass a pointer to the independent communication transport; and
   bind, in response to the open call, the network device driver to the network hardware device and provide the set of methods to the network hardware device via the independent communication transport, wherein the set of methods is translated from an abstract protocol stream into a network device specific protocol stream based on information specific to the network hardware device and a session relating to a transport layer protocol provided by a configuration file to the network device driver, the configuration file including information describing how to implement the communication transport.

8. Computer storage media having computer executable instructions for binding a network device driver to a network hardware device that, when executed by a processor, causes the processor to:
   load a network device configuration file to provide data regarding a communication transport to establish a communication with a network hardware device and includes a session relating to a transport layer protocol, the network device configuration file storing information describing how to generate the communication transport;
   convert an abstract network device call to a network hardware device specific call for the communication transport;
   request to bind the network device driver to the network hardware device;
   create and load the communication transport in response to the request and based on in the information stored in the network device configuration file;
   open the network device driver associated with the communication transport utilizing an open call that is used to pass a pointer to the communication transport;
   link the network device driver to the communication transport;

bind, in response to the open call, the network device driver to the network hardware device via the communication transport; and communicate, from the network device driver, to the network hardware via the communication transport.

9. The computer storage media of claim 8, wherein the network device driver converts abstract network device Application Programming Interface (API) calls to network hardware device specific API calls.

10. The computer storage media of claim 8, wherein network hardware device specific API calls are transported from the network device driver via the communication transport to the network hardware device.

11. The computer storage media of claim 8, wherein the configuration file is an extensible Markup Language file.

* * * * *